United States Patent Office 3,230,231
Patented Jan. 18, 1966

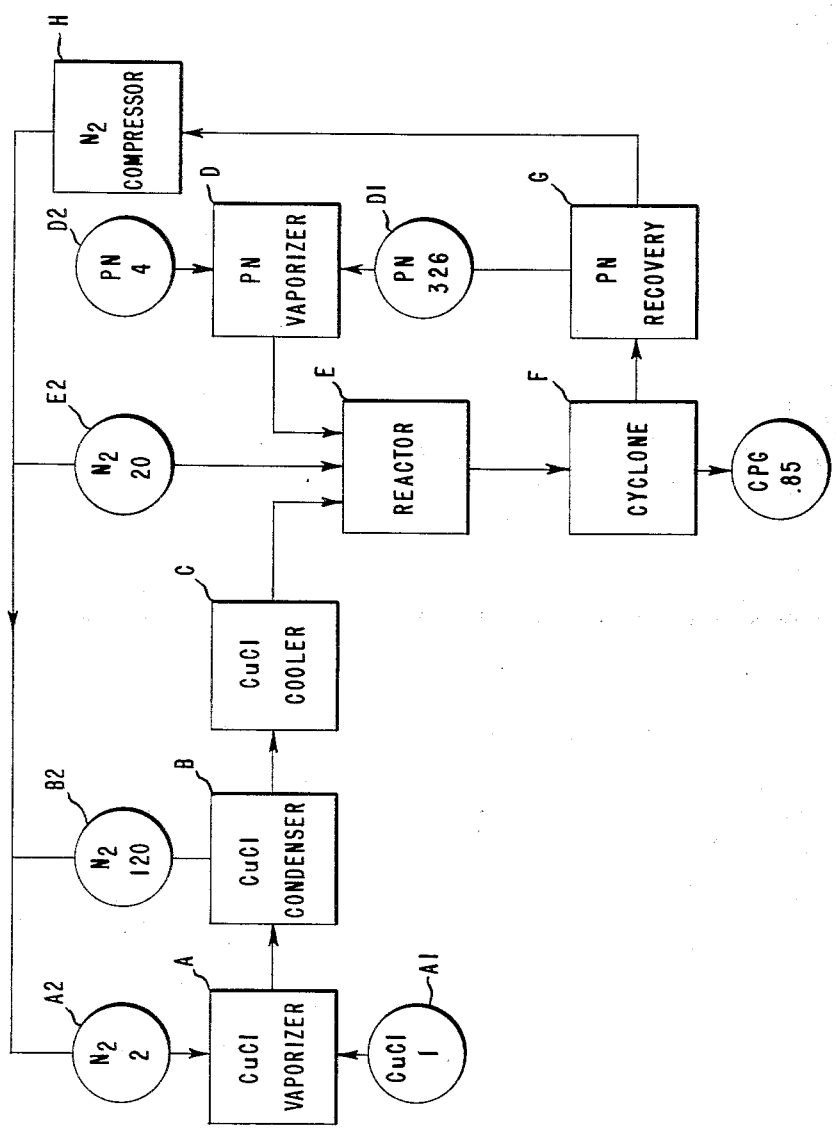

3,230,231
SYNTHESIS OF COPPER PHTHALOCYANINE
Henry F. Bartolo, Juergen H. Braun, and Charles H. Winter, Jr., Brandywine Hundred, Del., assignors to E. I. du Pont de Nemours and Company, Wilmington, Del., a corporation of Delaware
Filed Apr. 18, 1963, Ser. No. 274,006
6 Claims. (Cl. 260—314.5)

This invention relates to processes for synthesis of copper phthalocyanine pigments and deals, more particularly, with a new process whereby phthalonitrile is reacted with a suspension of fine copper chloride particles in an inert gas to form finely divided copper phthalocyanine.

Preparation of copper phthalocyanine by reaction of phthalonitrile with a copper salt such as copper (I) chloride or copper (II) chloride is well known in the art and is extensively used in the manufacture of copper phthalocyanine pigments. See, for instance, U.S.P. 2,129,013, wherein the two reagents are reacted in an intimately mixed solid state or while suspended in an inert solvent. But in essentially all prior art processes, whether produced from the mentioned two ingredients or by other syntheses, the reaction product must be acid-pasted, milled with salt or otherwise subjected to special operations which convert the crude product into a fine "pigmentary state," that is a physical form suitable for incorporation into liquid vehicles to produce inks, paints or lacquers.

It is accordingly an object of this invention to provide an improved process for the formation of copper phthalocyanine by the reaction of phthalonitrile with a copper chloride. A further object is to provide a process for direct synthesis of pigmentary copper phthalocyanine without a particle size reduction step. Other objects and achievements of this invention will appear as the description proceeds.

We have found that pigmentary copper phthalocyanine can be produced in good yield by reaction at elevated temperatures of phthalonitrile with an aerosol formed by cooling a mixture of a copper chloride vapor and a carrier gas below the melting point of the copper chloride. Moreover, the product obtained by this procedure is in the pigmentary size range and, unlike conventionally synthesized copper phthalocyanine, requires no particle size reduction to obtain pigments of commercial quality.

Accordingly, the invention comprises reacting phthalonitrile at elevated temperatures with a copper chloride as a small particle size solid suspended in a gas. In a preferred embodiment of the invention, pigmentary copper phthalocyanine is formed by reacting, at a temperature in the range 200–300° C., phthalonitrile with copper (I) chloride in the form of an aerosol produced by cooling the vapor of a copper (I) chloride below its melting point.

The sole figure in the annexed drawing constitutes a typical flow sheet for the process of this invention and is referred to in detail in Example I below. In this flow sheet, Arabic numerals inside the vessels indicate quantity in moles; PN stands for phthalonitrile; CPC stands for copper phthalocyanine; $N_2$, as usual, designates nitrogen. The remaining capital letters (sometimes followed by a number) are reference characters for the respective vessels or apparatus units.

The following examples serve to further illustrate the invention in detail. All parts given are by weight unless otherwise indicated.

*Example I*

One (1) mole of copper (I) chloride from supply vessel A1 is vaporized, in the presence of two moles of nitrogen gas from a supply vessel A2, at 1700° C. and 15 p.s.i.g., in a vaporizer A constructed of silicon carbide. The mixture passes into condenser B, where the vapor is condensed to a copper (I) chloride aerosol by addition to B of 120 moles of nitrogen at room temperature from vessel B2, and the mixture is then cooled in the heat exchanger C) from 400° C. to 30° C. Separately, 330 moles of phthalonitrile from vessels D1 and D2 is vaporized at 315° C. and 15 p.s.i.g. in vessel D. The phthalonitrile vapor from vessel D and the copper (I) chloride suspension in nitrogen from the vessel C are mixed in the reactor E with an additional 20 moles of nitrogen from vessel E2. The phthalonitrile reacts in E at 280–300° C. with the copper (I) chloride to give a high yield of copper phthalocyanine, calculated on the basis of the copper. The pigment is collected at 300° C. in cyclone separator F. The excess phthalonitrile is condensed in vessel G and returned through vessel D1 to the vaporizer. Nitrogen is compressed in compressor H and returned to vessels E2, B2 and A2 for reuse in the process. The reaction product is extracted with dilute acid, filtered and dried in conventional fashion. The product obtained is a greenish blue beta phase copper phthalocyanine pigment of strength equivalent to that of conventional pigmentary beta phase copper phthalocyanine.

*Example II*

Using an apparatus layout essentially as in Example I, copper (I) chloride is heated in a vaporizer in a stream of nitrogen to 950° C., and the vapors thus formed are conducted by the nitrogen stream into a condenser where the vapors are condenser to an aerosol by cooling below 100° C. with additional nitrogen. The suspension of particulate solid copper (I) chloride in nitrogen thus formed is passed into a reaction chamber, where it contacts a mixture of nitrogen and phthalonitrile vapor at about 300° C. introduced into the chamber by bubbling nitrogen through boiling phthalonitrile in a suitable container. The temperature in the reaction vessel is maintained at 150–210° C. by adjustment of the temperatures of the nitrogen-phthalonitrile vapor mixture and of the nitrogen suspension of copper (I) chloride. At this temperature, the phthalonitrile vapors condense on the copper (I) chloride particles and react to form copper phthalocyanine in the form of very small particles. The gas flows and reactor dimensions are such as to provide a residence time in the reactor of about 5 minutes. The copper phthalocyanine formed in the reactor is recovered by passing the reaction mixture from the reactor into a condensing vessel, where the mixture is cooled to condense any excess phthalonitrile, which is allowed to settle with the copper phthalocyanine product as a fluffy solid. The excess phthalonitrile is separated from the coper phthalocyanine product by sublimation in a suitable vessel, and the remaining product is extracted with dilute acid. A 7% conversion is obtained on the basis of the phthalonitrile, with a yield of 40% copper phthalocyanine on the basis of the copper salt used.

The product obtained is a beta phase, pigmentary copper phthalocyanine.

The use of copper (II) chloride in place of copper (I) chloride in this example gives like results.

*Example III*

Example II is repeated except that temperature of the reaction vessel is maintained at 320° C. Yields and product quality are substantially the same as in Example II.

It is not essential to vaporize the cuprous chloride in a stream of nitrogen. Instead, said chloride may be vaporized without nitrogen and the vapors then introduced into a nitrogen atmosphere and conducted jointly with the latter into a cooling vessel. This is illustrated in Example IV below.

*Example IV*

One (1) mole of copper (I) chloride is vaporized at 1700° C. and atmospheric pressure in a vaporizer constructed of silicon carbide. The copper (I) chloride vapor is then conducted into and condensed in another chamber by injecting into the latter 50 mols of nitrogen at room temperature. The copper (I) chloride dust and carrier gas are then cooled to 30° C. in a condenser. Separately, 8 moles of phthalonitrile is vaporized at 300° C. and atmospheric pressure in a vaporizer. The two gaseous streams are united and mixed in a reactor, which is maintained at 300° C., where they react to form copper phthalocyanine. The product is separated from the excess phthalonitrile and nitrogen by a cyclone separator, which is operated at 300–330° C. so as to separate the copper phthalocyanine as a solid and permit the excess phthalonitrile to escape to a condenser, from where the condensed excess phthalonitrile is returned to the process. The nitrogen is compressed and reused.

The reaction product is extracted, washed, and filtered, in conventional fashion, to yield a blue beta phase copper phthalocyanine pigment equal in strength to corresponding conventional pigmentary products. The yield of copper phthalocyanine is 70% of the theoretical calculated on the basis of the copper chloride.

If desired, the reaction may be catalyzed and thereby accelerated by introducing ammonia gas into the reaction chamber. This is illustrated in Example V.

*Example V*

Example IV is repeated but with use of a smaller reactor and decreased reactor retention time, by injecting 0.1 mole of ammonia into the reactor. The yield and product obtained are substantially the same as in Example IV, despite the smaller reactor and faster throughput. A lower yield is obtained under the conditions of this example if the ammonia is omitted.

It will be understood that the details of the above examples may be varied widely within the skill of those engaged in this art. For instance, The temperature of vaporization of copper chloride is not critical as long as it is maintained below the decomposition temperature of copper (I) chloride. With variation in temperature of vaporization of the copper salt, suitable adjustments in the quantity of diluent and in heating of the reactor are obviously necessary to bring the reaction mixture within the desired temperature range.

The temperature of the phthalonitrile-copper chloride reaction mixture can be varied over a wide range with satisfactory results. A minimum temperature of about 200° C. is required to bring about the reaction at a commercially practicable rate, while temperatures in excess of about 400° C. tend to produce decomposition of the phthalonitrile and reaction intermediates. At a temperature of about 300° C., product formation is rapid and thermal degradation effects are not significant.

It will be noted that the phthalonitrile melts at about 138 to 140° C. and boils at about 297° C. Consequently, at the temperatures of 300° C. and higher used in the above examples the phthalonitrile is truly vaporized. If, however, the temperature in the reaction chamber be allowed to drop to about 200° C., it may be expected part or all of the phthalonitrile will condense to form a fine mist suspended in the nitrogen atmosphere. In any event, however, there exists in the reaction chamber a system of phthalonitrile thinly and uniformly distributed in an inert gas, the volume of the phthalonitrile being coextensive with that of the gas. It will be clear, therefore, that this invention is not limited to any exact theory as to physical nature of the phthalonitrile component of the system, it being clear that this component is there in a reactive chemical state in any event.

Retention times in the reactor of 1 to 2 minutes at temperatures in the range 200–300° C. are preferred in the absence of added ammonia: ¼ to ½ minute is suitable when ammonia is added. If the said reaction times, in the stated temperature range are materially shorter, a decreased conversion of the copper salt to the desired product results, whereas longer retention times are disadvantageous from the economic viewpoint. The optimum retention time under any particular set of conditions is easily determined by one skilled in the art.

The quantity of diluent gas used to condense the copper chloride can be varied in accordance with the temperatures of the gas and the copper chloride vapor and conditions of mixing, in a manner which can be easily adjusted. The dimension and shapes of the reaction vessel can also be varied widely so long as rapid intimate mixing and adequate retention time is provided. It is preferred to use nitrogen as the diluent and cooling gas for the reaction, but other inert gases such as argon, helium, and the like, can also be used satisfactorily.

Materials of construction of the reaction vessels should be inert to the reactants and products and should withstand the temperature and pressure conditions involved. A preferred material for the vaporizer and those parts of the condenser exposed to extreme temperatures is silicon carbide, but graphite and other thermally stable inert materials can also be used.

Either copper (I) chloride or copper (II) chloride can be used as the source of the copper salt with substantially equivalent results.

The practical advantages of this invention will now be readily apparent.

The invention provides a low cost continuous process for manufacture of pigmentary copper phthalocyanine. No solvents are used, in contrast to many widely used syntheses, thereby avoiding the expense and hazard of conventional processes. The process of the invention yields copper phthalocyanine in pigmentary particle size without any of the expensive size reduction steps required by most commonly used prior procedures. Thus, the expense, hazard, and waste disposal problem of acid pasting are avoided; the fire and explosion hazards of some prior art finishing processes which involved milling in flammable solvents are not encountered in the process of the invention; and the time and expense of such prior art processes as salt milling and acid swelling are also circumented.

We claim as our invention:

1. A process for producing copper phthalocyanine, which comprises reacting phthalonitrile, uniformly distributed in an inert gas, with a finely divided copper chloride which is suspended as an aerosol in an inert gas.

2. A process as in claim 1, wherein the copper chloride is a member of the group consisting of cuprous chloride and cupric chloride.

3. A process as in claim 2, wherein the inert gas in both instances is nitrogen.

4. A process as in claim 3, wherein the reaction temperature is in the range of 150 to 400° C.

5. A process as in claim 4, wherein the reaction is effected in the presence of gaseous ammonia as a catalyst.

6. A process of producing copper phthalocyanine, which comprises reacting an intimate mixture of phthalonitrile vapor and nitrogen, at a temperature in the range of 200 to 400° C., with a suspension of finely divided copper chloride in nitrogen, and recovering from the gaseous reaction mixture finely divided copper phthalocyanine.

References Cited by the Examiner

UNITED STATES PATENTS

| | | | |
|---|---|---|---|
| 2,124,419 | 7/1938 | Heilbron | 260—314.5 |
| 2,194,250 | 3/1940 | Turek | 260—314.5 |
| 2,245,098 | 6/1941 | Turek | 260—314.5 |
| 2,302,612 | 11/1942 | Lacey | 260—314.5 |
| 2,585,037 | 2/1952 | Robinson et al. | 260—314.5 |
| 3,096,155 | 7/1963 | Gordon et al. | 260—314.5 |

WALTER A. MODANCE, *Primary Examiner*